Figure 1:
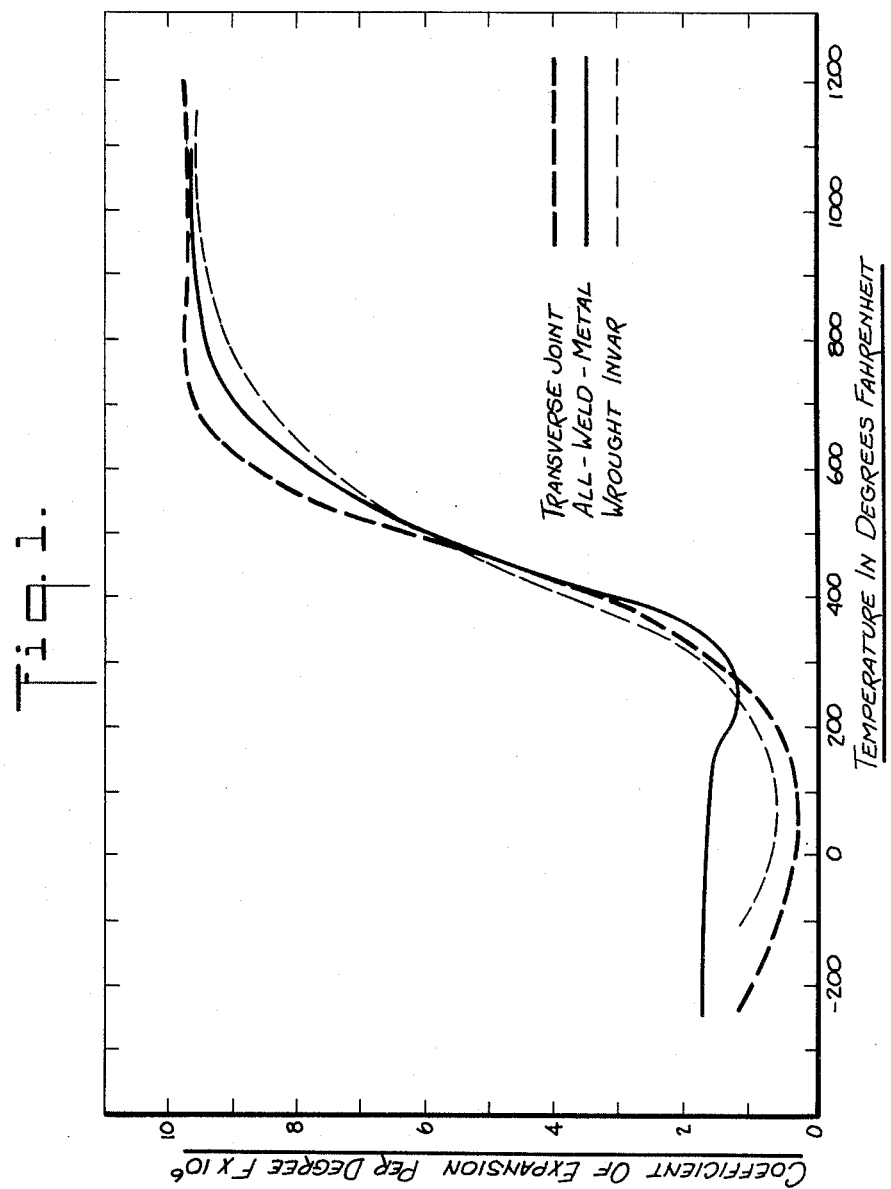

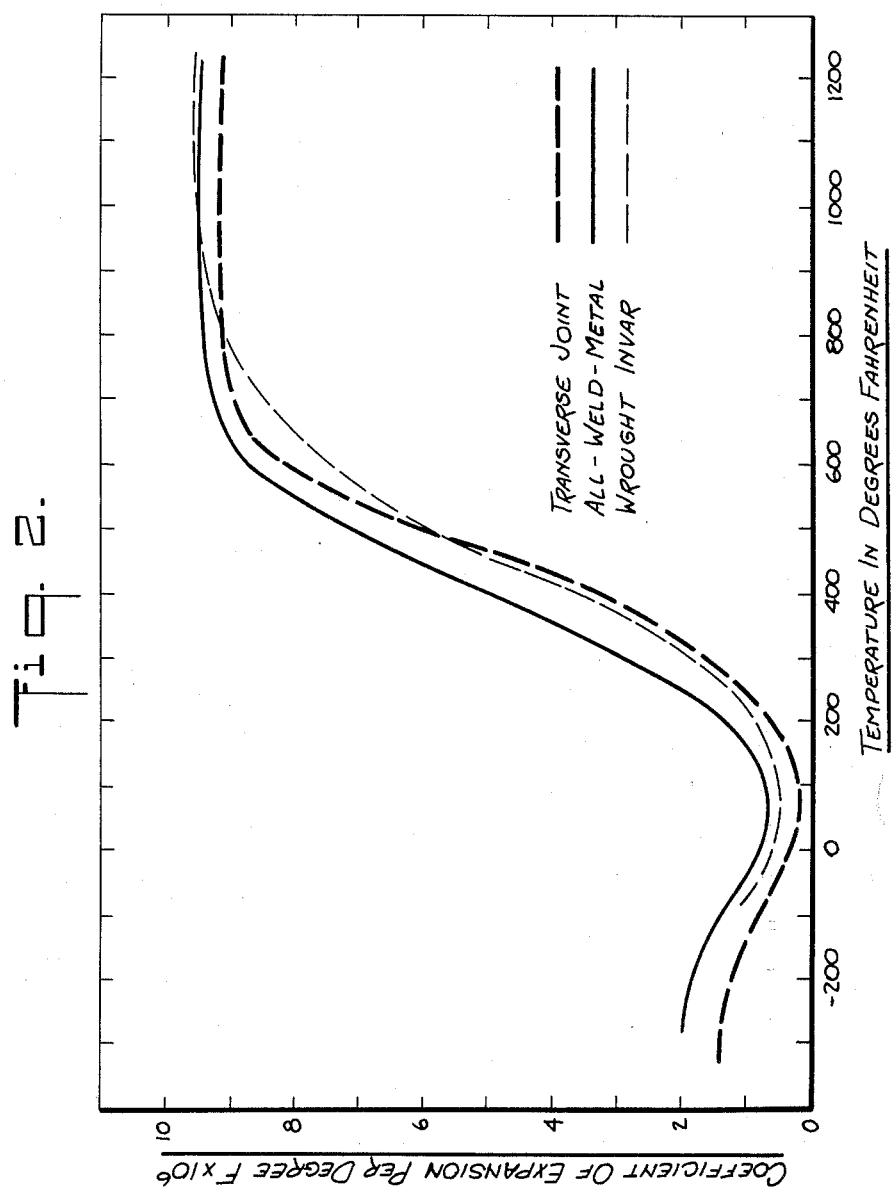

United States Patent Office 3,184,577
Patented May 18, 1965

3,184,577
WELDING MATERIAL FOR PRODUCING WELDS
WITH LOW COEFFICIENT OF EXPANSION
Charles E. Witherell, Bound Brook, N.J., assignor to The
International Nickel Company, Inc., New York, N.Y.,
a corporation of Delaware
Filed Jan. 18, 1963, Ser. No. 252,382
16 Claims. (Cl. 219—137)

The present invention relates to welding materials for producing welds and/or overlays with low expansivity characteristics and, more particularly, to welding materials containing nickel and/or iron as the predominant metallic elements, which welding materials when shielded from the ambient atmosphere produce welds and/or overlays having low coefficients of thermal expansion.

It is well known that alloys of iron and nickel oftentimes exhibit rather unusual characteristics and/or properties. One of the unusual characteristics is exemplified by the curious effect of nickel upon the coefficient of thermal linear expansion which is said to have been first observed by C. G. Guillaume in 1896. He is said to have discovered that the thermal expansion coefficients of iron-nickel alloys could be made to vary from extremely low values to relatively high values simply by varying the nickel content over a certain range. For example, the iron alloy nominally containing approximately 36% nickel showed practically a constant length over a fairly wide range of temperatures, e.g., from about −100° F. to about 300° F. This substantial invariance in length within the aforementioned temperature range gave rise to the name "Invar" for such iron-nickel alloys. Later, the name was generically applied to a family of iron-nickel alolys that were characterized by a wide variety of controlled expansivity coefficients through variations in the nickel content.

While most of the applications for these alloys have involved relatively small components, such as instruments, electronic gear, glass seal-in wires, requiring little welding, if any, it has recently been found particularly desirable to provide components of low expansivity alloys for important industrial applications to reduce stress and the possibility of fatigue failure under thermal cycling. In such cases, it then becomes important to be able to confidently weld these alloys. In addition, for optimum performance, the welds should have compositions and expansion characteristics substantially similar to those of the metal to be welded, i.e., the base metal, as well as being sound, strong and ductile.

It was once thought that Invar alloys would offer no particular welding problems. This erroneous belief was based upon a number of welding experiences with relatively thin sections which were less than about ⅛ inch thick, using mostly oxyacetylene or resistance welding processes. These processes are, of course, somewhat impractical, particularly for large sections, as well as being uneconomical. In addition, it was found that, even when welding thin sections, the fusion welds had a marked tendency to be porous. The attempts to obviate porosity in the welds by carefully controlling the mechanics of the welding operation also proved unsuccessful.

In recent years, with the steadily increasing need for welding heavier sections of Invar alloys, the heretofore mentioned difficulties became magnified. As a consequence thereof, the art turned to the gas-tungsten-arc welding process using a matching filler wire composition in an attempt to obviate the prior difficulties. The gas-tungsten-arc process was chosen since it is generally reliable, easy to use and considerably less severe than other processes. As was previously mentioned, the filler wires employed in these prior attempts have usually been of a composition matching the base metal and often were obtained by simply cutting strips from the plate. In use, these gas-tungsten-arc filler metals produced welds which were generally unsound, i.e., the welds produced thereby tended to be porous while also exhibiting cracking tendencies.

Faced with the difficulties involved in using matching filler wire compositions, the art turned to the use of welding materials which are known to be capable of making sound joints in iron-nickel alloys. These materials are a partial solution to the problem of weld cracking and/or porosity incident to the welding of Invar-type alloys. However, it was not a complete solution since the known welding materials capable of laying down sound welds are not of an iron-nickel alloy type welding electrode so that the weld obviously does not have the same coefficient of expansion as the Invar base metal.

Although many attempts were made to overcome the foregoing difficulties and other disadvantages, none, as far as I am aware, was entirely successful when carried into practice commercially on an industrial scale.

It has now been discovered that sound, non-porous, crack-free weld and/or overlay metal of low coefficient of thermal expansion can be produced by employing a special welding material containing a unique combination of ingredients.

It is an object of the present invention to provide a welding material which, in use, deposits sound welds and overlays of low coefficient of thermal expansion.

It is another object of the present invention to provide an improved coated and/or covered welding electrode which has a flux coating (containing slag-forming and flux-forming ingredients) in novel combination with a unique alloy core wire containing iron and/or nickel as the predominant metallic elements in conjunction with special proportions of other ingredients, which electrode is particularly adapted for use in all positions.

It is a further object of this invention to provide an improved coated electrode comprising a novel combination of ingredients in special proportions, which electrode in use deposits weld and overlay metal of low coefficient of thermal expansion.

Another object of the invention is to provide a novel consumable bare welding filler wire having a unique combination of elements in special proportions for inert-gas metal-arc welding, which filler wire is capable of depositing ductile, porosity-free and crack-free weld metal having a low coefficient of thermal expansion.

The invention also contemplates providing an improved filler metal weld rod for inert-gas tungsten-arc welding which in use deposits welds and/or overlays on base metal having a low coefficient of thermal expansion, which welds have substantially similar coefficients of expansion as the base metal.

It is likewise within the contemplation of the invention to provide a novel, bare filler wire for inert-gas metal-arc welding of metals and/or alloys of low expansivity, which weld rod in use produces welds having substantially similar low expansivity as the metals and/or alloys being welded.

Still another object of the present invention is to provide a novel process for producing ductile, substantially non-porous and substantially crack-free alloys of low coefficient of thermal expansion by arc-welding in a protective atmosphere.

Other objects and advantages will become apparent from the following description taken in conjunction with the accompanying drawings in which:

FIGURE 1 is a graph illustrating the coefficients of expansion for weld metal produced using a coated electrode within the scope of the present invention, for transverse joint metal and for base metal at various temperatures; and FIGURE 2 is a similar graph as that illustrated in FIGURE 1 except that it depicts the coefficients of expansion for weld metal produced using a bare filler wire in the inert-gas tungsten-arc process as well as the coefficients of expansion for transverse joint metal and for base metal at various temperatures.

Broadly stated, the present invention contemplates a welding material for use in shielded arc welding, including arc welding with flux-coated electrodes, inert-gas metal-arc welding, inert-gas tungsten-arc welding, etc. In general, the welding material is ferrous and contains, by weight and in addition to any flux-forming and any slag-forming ingredients, about 30% to about 60% nickel, about 0.5% to about 3% titanium, up to about 8% manganese, up to about 2.5% silicon, up to about 0.1% calcium, up to about 0.8% carbon, with the balance essentially iron. According to this invention, when the aforementioned welding material is used in combination with slag-forming and flux-forming ingredients, e.g., as a coated electrode, the manganese and carbon contents are so correlated to the titanium content that when the titanium content is more than about 2%, the summation of manganese and ten times the carbon is more than about 2%. On the other hand, when the titanium content of the welding material of this invention is less than about 2% and the welding material is used with flux-forming and slag-forming ingredients, manganese must be present in amounts of at least about 1% and the summation of manganese and twelve and one-half times the carbon is at least about 3%. In addition to iron, nickel, titanium, any manganese and any carbon, the welding material of this invention may also contain, by weight, up to about 40% cobalt, up to about 10% chromium, up to about 5% tungsten, up to about 5% molybdenum and up to about 5% aluminum. The exact amounts of each of the elements cobalt, chromium, tungsten, molybdenum and aluminum depend upon the desired levels of characteristics and/or properties sought in the weld metal as well as being dependent upon the base metal which is to be welded. In each and every case, however, the balance of the welding material is iron which is present in amounts of at least about 25%, and, advantageously, at least about 35%.

Titanium is essential to the welding material of this invention in order to eliminate weld porosity. At least about 0.5% titanium (the minimum required by this invention) should be present but it is not essential that this amount or any amount be recovered in the weld deposit. In addition, titanium also aids in the reduction of weld cracking. However, in order to substantially completely eliminate weld cracking by the addition of titanium only in the welding material, it is necessary that the welding material contain at least about 2.5% titanium. In some cases, particularly in the case of inert-gas arc welding, the use of a welding material containing 2.5% or more titanium may be detrimental since an undesirable heavy refractory oxide film is produced on the weld surface. Furthermore, titanium, when present in the welding material in amounts toward the higher end of the range, i.e., 1.5% to 3%, causes the weld deposit produced to be susceptible to age-hardening and also tends to raise the coefficient of expansion to higher values which may be deleterious in certain critical applications. In addition, titanium when used at the higher end of the required range, e.g., about 1.5% to about 3%, tends to raise the nickel content required for minimum expansivity and lower the inflection temperature. Thus, titanium is advantageously present in the welding materials of this invention in amounts of about 0.8% to about 2%, e.g., about 0.8% to about 1.5%. However, titanium when used in the broad range is always beneficial from the standpoint of eliminating porosity and may be of assistance in decreasing weld cracking if age-hardenability of the deposits is not a design factor. When the welding material is employed with slagging and fluxing ingredients, the titanium must be in the core and not in the flux.

Carbon, when present in the welding material, has the effect of aiding in the elimination of weld cracking without giving rise to the aforementioned detrimental effects caused by the use of high amounts of titanium. However, carbon tends to shift the composition required for minimum expansivity to lower nickel contents. On the other hand, manganese, when present in the welding material, has the opposite effect of carbon with regard to the shifting of the composition required for minimum expansivity, i.e., manganese shifts the composition required for minimum expansivity towards higher nickel contents. In addition, manganese aids in the elimination of weld cracking. Thus, where carbon and manganese are properly controlled the composition with regard to the nickel content may be properly maintained within a very narrow range so that there is an assurance of substantially constant minimum expansivity in the weld deposit. Excessive carbon in the welding material, i.e., more than about 0.8% and preferably not more than about 0.6%, and more than about 8% manganese and preferably not more than about 5%, should be avoided in that, when present in such amounts, they tend to upset the coefficient of expansion and nickel content required for minimum expansivity.

In carrying the invention into practice, advantageous results are obtained when the welding material, which is capable of being employed with slag-forming ingredients and flux-forming ingredients, contains, by weight of metallics, including carbon and any silicon, about 30% to about 40% nickel, about 0.8% to about 2% titanium, about 1% to about 3.5% manganese, about 0.05% to about 0.35% carbon, provided that when the welding material is used in combination with slag-forming and flux-forming ingredients, the manganese and carbon contents are so correlated that the summation of manganese and twelve and one-half times the carbon is at least about 3%, up to about 0.5% silicon, up to about 0.05% calcium, up to about 30% cobalt, up to about 10% chromium, up to about 5% tungsten, up to about 5% molybdenum and up to about 5% aluminum with the balance essentially iron in amounts of at least about 35%.

As was mentioned hereinbefore, the welding material of the present invention can be used in inert-gas arc welding, e.g., in the tungsten-arc process or in a process wherein the metal itself is the consumable electrode. In either case, the filler metal used in the inert-gas metal-arc welding contains, by weight, about 30% to about 60% nickel, about 0.5% to about 3% titanium, up to about 4% manganese, up to about 0.35% carbon, up to about 2.5% silicon, up to about 0.1 calcium, up to about 40% cobalt, up to about 10% chromium, up to about 5% tungsten, up to about 5% molybdenum and up to about 5% aluminum with the balance essentially iron in amounts of at least about 25%. Advantageously, the filler wire for use in inert-gas metal-arc welding contains, by weight, about 30% to about 40% nickel, about 0.8% to about 1.5% titanium, about 1% to about 3.5% manganese, about 0.05% to about 0.2% carbon, up to about 0.3% silicon, up to about 0.05% calcium, up to about 30% cobalt, up to about 10% chromium, up to about 5% tungsten, up to about 5% molybdenum and up to about 5% aluminum with the balance essentially iron in amounts of at least about 35%. It is to be noted that, advantageously, the filler metal welding material of this invention contains special proportions of manganese and carbon as well as titanium. The addition of the former two elements to the welding material serves to minimize the coefficient of thermal expansivity of weld deposits made therefrom and to stabilize the nickel content at that composition where the alloy has the optimum coefficient of thermal expansion.

The welding material of this invention can also include from about 30% to about 55% of slag-forming and flux-forming ingredients, by weight of metallic constituents; for example, it can be used as a coated electrode. When used as a coated electrode, the welding material contains, by weight of metallic constituents including any carbon and any silicon, about 30% to about 60% nickel, about 0.5% to about 3% titanium, up to about 8% manganese, up to about 0.8% carbon, the said manganese and said carbon being so correlated to said titanium that when said titanium content is over about 2% the summation of manganese plus ten times carbon is more than about 2% and when the titanium content is less than about 2%, manganese is present in amounts of not less than about 1% and the summation of manganese and twelve and one-half times carbon is at least about 3%, up to about 2.5% silicon, up to about 0.1% calcium, up to about 40% cobalt, up to about 10% chromium, up to about 5% tungsten, up to about 5% molybdenum and up to about 5% aluminum with the balance iron in amounts of at least about 25%. It is to be noted that when the titanium is over about 2% in the welding material for use in a coated electrode, neither manganese nor carbon is individually essential thereto. However, at least one of them must be present. Thus, when carbon is not present in the welding material, the manganese must be at least about 2%. On the other hand, when manganese is not present in the welding material, the carbon content must be at least about 0.2%. In addition, the manganese and the carbon may be copresent simultaneously, and when they are copresent the summation of manganese and ten times carbon content is more than about 2%. When this correlation is maintained, one can be assured that the welds produced using the coated electrode will be substantially non-porous and crack-free. When the titanium content is less than about 2%, manganese must also be present in the coated electrode in amounts not less than about 1% and the summation of manganese and twelve and one-half half times any carbon must be at least about 3%. Thus, while carbon is not essential when the titanium content is so limited, manganese is essential. At the minimum manganese content of about 1% the carbon content is at least about 0.16%. Any of the aforementioned ingredients may be present entirely in the flux, entirely in the core, or partly in the core and partly in the flux. Advantageously, the ingredients are in the core since a more predictable and consistent weld composition would result. In this connection, when either manganese or carbon or both is present in the flux, the amounts of each should be toward the higher end of the range since the recovery of these ingredients across the arc is about 50% to about 60% for manganese and about 20% to about 30% for carbon. On the other hand, when the manganese and/or carbon are present in the core, the amounts of each should be toward the lower end of the range since the recovery of these ingredients across the arc is about 75% for manganese and about 90% for carbon. Thus, the flux may contain up to about 20% manganese and up to about 2% carbon while the core may contain up to about 4% manganese and up to about 0.35% carbon.

Advantageously, when the welding material is used as a coated electrode, the core wire contains, by weight, about 30% to about 40% nickel, about 0.8% to about 2% titanium, e.g., about 0.8% to about 1.5% titanium, about 1% to about 3.5% manganese, about 0.05% to about 0.35% carbon, the said manganese and said carbon being so correlated that the summation of manganese percentage and twelve and one-half times the carbon percentage is at least about 3%, up to about 0.5% silicon, up to about 30% cobalt, up to about 10% chromium, up to about 5% of each of tungsten, molybdenum and aluminum with the balance iron in amounts of at least about 35%.

Known flux compositions containing slag-forming and flux-forming ingredients may be used in combination with the welding material when it is used as a coated electrode. One particularly advantageous flux having extremely good operability as well as excellent fluxing and slagging characteristics when used in combination with the welding materials of this invention is shown in Table I.

TABLE I

| Flux coating | Range percent | Advantageous range, percent |
|---|---|---|
| Alkaline earth metal (carbonate selected from the group consisting of calcium carbonate, barium carbonate, strontium carbonate, and combinations thereof).* | 20 to 55 | 25 to 50. |
| Cryolite | 10 to 50 | 20 to 40. |
| Titanium dioxide | Up to 40 | 10 to 40. |
| Bentonite | Up to 5 | 2 to 5. |

*Advantageously, calcium carbonate.

Other fluxes, e.g., a lime-type flux containing alkaline earth metal carbonate, fluorspar and cryolite, may also be used as those skilled in the art will readily understand.

The ingredients used in making the flux are advantageously powdered ingredients. In general, the mixed ingredients usually have a particle size of between about 60 microns and about 300 microns.

A water dispersible binder ordinarily is employed with the flux to provide a durable and hard coating on the core wire after drying and baking. The binder advantageously is of the silicate type as it produces a durable coating, i.e., a coating that is resistant to mechanical damage, that does not require a rebake prior to use. The silicate type binder may be an aqueous solution of sodium silicate and/or potassium silicate. Table II gives the amounts (in parts by weight per 100 parts of the dry flux) of ingredients which can be used for the binder. It is to be appreciated however, as those skilled in the art will readily understand, that a silicate solution of a different specific gravity than shown herein also can be used.

TABLE II

| Ingredient | Range | Example |
|---|---|---|
| Sodium silicate solution (47° Baumé). | 10 to 20 | 15 |
| Water | As needed to provide extrudable consistency. | 2 |

The flux coating can be applied to the core wire in any suitable manner, e.g., by an extrusion process, and dried on the wire surface by suitable drying and/or baking. This results in a hard adherent coating of high mechanical strength relatively resistant to mechanical damage under normal handling conditions. A satisfactory drying or baking treatment of the flux and binder mixture comprises a normal continuous oven drying treatment followed by a baking treatment comprising gradually raising the temperature to about 600° F. and holding at that level for about two hours.

Examples of typical coated electrode dimensions (core diameter plus flux thicknesses) are given in Table III. All dimensions therein contained are in portions of an inch.

TABLE III

| Core diameter | Electrode diameter, range | Electrode diameter, example |
|---|---|---|
| 3/32 | 0.12 to 0.15 | 0.13 |
| 1/8 | 0.17 to 0.2 | 0.18 |
| 5/32 | 0.21 to 0.23 | 0.22 |
| 3/16 | 0.25 to 0.27 | 0.26 |

However, it is permissible, as will be apparent to those skilled in the art, to vary considerably the core diameter-flux thickness relationships from those set forth in Table III. However, the flux coating usually constitutes from about 20% to about 55%, e.g., 25% to about 35%, by weight of the electrode.

The core for the coated electrode, advantageously, has the composition hereinbefore set forth for the filler wire welding material so that only one type metal need be stocked and when the core has such a composition it can be used with any of the fluxes mentioned herein, particularly those in Table I. In addition, as was mentioned hereinbefore, weld deposits made using a coated electrode having the metallic constituents in the core have a more predictable composition.

The compositions of the deposits and/or overlays, of course, will vary depending upon the exact composition of welding material employed and the amount of dilution by the composition of the base metal being welded. However, the composition of deposits constituted entirely of weld metal made by using the welding material of this invention will have compositions in the ranges shown in Table IV (in percent by weight).

TABLE IV

| Ingredient: | Range, percent |
|---|---|
| Nickel | 30 to 60. |
| Manganese | Up to 8. |
| Titanium | Up to 3. |
| Silicon | Up to 2.5. |
| Carbon | Up to 0.8. |
| Calcium | Up to 0.1. |
| Cobalt | Up to 40. |
| Chromium | Up to 10. |
| Tungsten | Up to 5. |
| Molybdenum | Up to 5. |
| Aluminum | Up to 5. |
| Iron | Balance, at least 25. |

Advantageously, the weld deposit contains, by weight, about 30% to about 40% nickel, about 0.03% to about 0.8% titanium, about 0.5% to about 2% manganese, up to about 0.5% silicon, up to about 0.05% calcium, up to about 30% cobalt, up to about 10% chromium, up to about 5% tungsten, up to about 5% molybdenum and up to about 5% aluminum with the balance essentially iron in amounts of at least about 35%.

For the purpose of giving those skilled in the art a better understanding of the invention and a better appreciation of the advantages of the invention, the following illustrative examples are hereinafter set forth:

*Example I*

A single-V-groove butt-weld was made in ½″ Invar alloy plate containing about 36% nickel, about 0.3% manganese, about 0.05% carbon, about 0.1% silicon with the balance essentially iron to determine joint properties and to demonstrate the welding response of the coated electrode welding material of this invention. The joint members were 4 inches wide by 6 inches long by ½ inch thick and were welded using an electrode having a diameter of about 0.22 inch. The flux contained about 33% calcium carbonate, about 31% cryolite, about 32% titanium dioxide, about 1% granular carbon and about 3% bentonite. A binder containing a sodium silicate solution was also added to the dry flux and a flux composition was extruded onto a core wire having a diameter of 5/32 inch. The electrode was baked after the extrusion by raising the temperature gradually to 600° F. and holding at that temperature for about two hours. The core wire contained about 36% nickel, about 3% manganese, about 1% titanium, about 0.1% silicon, about 0.1% carbon and about 0.02% calcium with the balance, apart from incidental elements, essentially iron.

The joint had a 3/32 inch root spacing positioned over a grooved copper backing bar. The V-groove was about 80°. The weld joint was restrained from warping during welding by clamping securely to a 2 inch thick steel welding table. All welding was done from one side with the exception of the root-sealing pass which was deposited on the back side of the joint after the root had been back-chipped.

After welding, the joint was stress-relieved at about 1200° F. for about one and one-half hours. The hardness of the weld deposit before and after the heat treatment was the same, to wit, 77 Rockwell B. The weldment was then X-rayed at a sensitivity of 2% and was found to be essentially free of porosity. The 6-inch long joint was then cross-sectioned to provide (1) four ⅜-inch wide cross-sectional slices for side-bend tests; (2) two ½-inch wide cross-sections for machining into tensile specimens; and (3) two ⅜-inch wide slices to be machined into dilatometer test specimens. All cross-sectional faces were polished on a fine-grained rubber-bonded abrasive wheel and etched with mixed acids, i.e., Lepito's reagent, to reveal weld outline. The cross-sections were then examined under a metallurgical microscope at a magnification of 15 diameters (15×). No weld cracking was observed in any of the 16 faces examined thus indicating the soundness of the welds produced using the coated electrode welding material of this invention.

The four ⅜-inch wide side-bend test specimens were subjected to a 180° side-bend test by bending the specimens at the weld around a cylindrical steel pin having a radius equal to two times the thickness of the specimen (⅜-inch thick specimen requires a pin having a diameter of 1½ inches). The specimens were bent 180° with the weld cross section in transverse tension. Again, no defects were observed in any of the four specimens after the severe 180° bend.

The two transverse tensile test blanks cut from the weld were machined into standard 0.252-inch diameter tensile specimens and tested to failure. In each case, the failure occurred in the plate, not the weld. Other results of the tensile tests are listed in Table V.

TABLE V

| Weld No. | Ultimate tensile strength, (U.T.S.), pounds per square inch (p.s.i.) | 0.2% offset yield strength (Y.S.), p.s.i. | Elongation in 1″, percent | Reduction in area (R.A.), percent |
|---|---|---|---|---|
| 1 | 69,500 | 43,000 | 31 | 68 |
| 2 | 69,500 | 43,100 | 35 | 76 |

The dilatometer specimens machined from transverse weld cross-sections were 3½ inches long. Expansivity characteristics were determined from the temperature of liquid nitrogen (−320° F.) to 1200° F. by means of a recording dilatometer which measured the overall change in length of a specimen with changing temperature. The expansion characteristics of the transverse specimens are included in FIGURE 1 which also shows the expansion characteristics for all-weld-metal as well as for base metal. The all-weld-metal data were collected on a specimen which was machined from a weld deposit of a 5/16-inch thick butt joint made using a coated electrode having a composition similar to that heretofore described. FIGURE 1 confirms that the expansion characteristics of the all-weld-metal, transverse joint metal and the base metal are practically similar throughout this extremely wide range of temperatures.

*Example II*

A single V-groove butt weld 6 inches long was made in ½-inch Invar plate having a composition similar to the plate set forth in Example I using the inert-gas tungsten-arc process with a bare filler metal to illustrate joint properties and to demonstrate the welding response of the filler metal of this invention. The joint design was identical to that used in Example I. In addition, the filler wire had the same composition as the core of Example I. The diameter of the filler metal was 5/32 inch. The process was manually controlled and an argon-shielding gas was used. After the welding on the top side was completed, the joint was turned over, the back side chipped out, and a sealing pass deposited. The joint restraint was the same as that set forth in Example I.

After welding, the joint was stress-relieved at about 1200° F. for about one and one-half hours and air cooled. The hardness of the weld deposit before heat treatment was 78 Rockwell B. No change in hardness was observed after heat treatment. The weld was then X-rayed at a sensitivity of 2% and was found to be essentially free of porosity. Thereafter, the joint was cross-sectioned to provide specimens for four side-bend tests, two transverse tensile tests and two transverse dilatometer determinations. All cross-sections were polished on a fine-grained rubber-bonded abrasive wheel and etched with Lepito's reagent to reveal weld outline. The cross sections were then examined under a microscope at 15×. No weld cracking was observed in any of the 16 faces examined clearly indicating the soundness of the welds produced using the filler metal of this invention. The four bend specimens were examined after the side-bend tests as described in Example I and no defects were observed in any of the four specimens after the 180° bend despite the severity of the test. Results of the transverse tensile tests on specimens machined from two of the cross-sectional slices are indicated in Table VI.

TABLE VI

| Weld No. | U.T.S., p.s.i. | 0.2% Y.S., p.s.i. | Elongation, percent | R.A., percent | Location of fracture |
|---|---|---|---|---|---|
| 3 | 67,700 | 42,700 | 34 | 62 | Weld. |
| 4 | 68,700 | 43,200 | 34 | 56 | Do. |

The dilatometer data for both transverse weld specimens and all-weld-metal are included in FIGURE 2. Again, values were obtained over a wide range of temperatures, i.e., from −320° F. to 1200° F. The curves of FIGURE 2 illustrate the substantially similar coefficients of expansion that were obtained for the transverse joint metal, the all-weld-metal and the base metal.

Example III

In order to illustrate the effect of titanium in the welding material of this invention, a series of welding tests was conducted using bare filler metal to which varying additions of titanium were made. The filler metal in each test had a diameter of 5/32 inch. The titanium contents of these filler wires ranged from 0% to about 3.5%. The gas tungsten-arc process was chosen as the welding method because it introduces a minimum of variables; furthermore, it is a relatively simple and commercially attractive means for joining alloys of the Invar type.

The X-weld crack test was used as a means for evaluating the effects of the titanium addition. The X-welds were made by depositing a weld between two 3-inch long by 1-inch square bars of Invar having a composition as previously set forth in Example I. The two bars were butted together along an edge of the 3-inch length such that the adjoining surfaces of the two bars formed a double-V-groove type joint. Weld passes were deposited on alternate sides and the specimen was allowed to cool to below 200° F. between each set of passes. After welding, the specimen was sectioned 1 inch from each end for macroexamintion of the cross sections.

The 4 cross-sectional faces resulting from the 2 cuts were polished on a fine-grained rubber-bonded abrasive wheel, etched with Lepito's reagent to outline the weld structure and examined at 15× for evidence of cracks or porosity. The number of cracks (as well as all other data) are tabulated in Table VII and the weld-cracking tendency evaluated in terms of the average number of X-weld cracks per cross section per specimen.

TABLE VII

| Weld No. | Composition of filler metal, percent | | | | | | Weld data | |
|---|---|---|---|---|---|---|---|---|
| | Ni | Mn | Si | Ti | C | Fe | Cracks* per section | Porosity |
| 5 | 36 | 0.4 | 0.05 | 0.00 | 0.02 | Bal | Severe (L) | Excessive. |
| 6 | 36 | 0.4 | 0.05 | 0.18 | 0.02 | Bal | ----do---- | Do. |
| 7 | 36 | 0.4 | 0.05 | 0.43 | 0.02 | Bal | 5.5 (L) | Some. |
| 8 | 36 | 0.4 | 0.05 | 0.76 | 0.02 | Bal | 5.0 (M) | None. |
| 9 | 36 | 0.4 | 0.05 | 0.98 | 0.02 | Bal | 5.5 (SM) | Do. |
| 10 | 36 | 0.4 | 0.05 | 1.57 | 0.02 | Bal | 2.5 (SM) | Do. |
| 11 | 36 | 0.4 | 0.05 | 2.57 | 0.02 | Bal | None | Do. |
| 12 | 36 | 0.4 | 0.05 | 3.37 | 0.02 | Bal | ----do---- | Do. |

*S=less than 0.02 inch long.
M=0.02 inch to 0.05 inch long.
L=more than 0.05 inch long.
SM=predominantly S, but some M.

From Table VII it is clear that the porosity in the weld was decreased with as little as 0.43% titanium and eliminated with 0.76% titanium in the welding material. However, about 2.5% titanium is required in the welding material to completely eliminate all cracking in the weld under these severe conditions and when the welding material contains only minor amounts of manganese and carbon.

Example IV

In order to illustrate the effect of carbon, a series of coated electrodes was produced wherein a ferrous core wire was used containing about 36% nickel, about 0.4% manganese, about 0.05% silicon, about 0.02% carbon and varying amounts of titanium as hereinafter set forth in Table VIII. The flux coatings were metallurgically neutral and contained varying amounts of carbon. Each coating used was a lime-cryolite formulation (without any alloying ingredients) that afforded good cleansing and fluxing action. This flux contained, in addition to carbon, 47% calcium carbonate, 3% bentonite with the balance cryolite (50%). The flux was bonded to the core by extrusion with an aqueous solution of sodium silicate. Coated electrodes were chosen because this welding method afforded a direct means for addition of carbon to the weld fusion. The diameter of the core wire for each coated electrode was about 5/32 inch.

The several series of coated electrode compositions were used in X-weld tests to evaluate the possible effects of carbon and the effect of copresent titanium on weld cracking and porosity. Samples of weld metal from undiluted areas of the X-welds were removed by shaper cuts for chemical analysis. The carbon content of the weld metal was found to range up to about 0.2% and the titanium content of the weld metal was between about 0.06% and about 0.12% for welds 13 through 16 and between about 0.3% and about 0.4% for welds 17 through 20. The results of these series of welding tests are given in Table VIII.

TABLE VIII

| Weld No. | Titanium content of core wire, percent | Carbon content in coating, percent | Carbon content in electrode, percent * | X-weld data | |
|---|---|---|---|---|---|
| | | | | Cracks | Porosity |
| 13 | 1.59 | None | 0.02 | 32 | None |
| 14 | 1.59 | 0.5 | 0.23 | 27 | None |
| 15 | 1.59 | 1.0 | 0.46 | 20 | None |
| 16 | 1.59 | 1.5 | 0.69 | 16 | None |
| 17 | 2.57 | None | 0.02 | 6 | None |
| 18 | 2.57 | 0.5 | 0.23 | 3 | None |
| 19 | 2.57 | 1.0 | 0.46 | 1 | None |
| 20 | 2.57 | 1.5 | 0.69 | 0 | None |
| 21 | 3.37 | None | 0.02 | 9 | None |
| 22 | 3.37 | 0.5 | 0.23 | 5 | None |
| 23 | 3.37 | 1.0 | 0.46 | 0 | None |
| 24 | 3.37 | 1.5 | 0.69 | 0 | None |

* By weight of the electrode exclusive of slag-forming and flux-forming ingredients.

Table VIII clearly confirms that titanium in the core wire of coated electrodes is as effective as titanium in the filler wire in gas tungsten-arc welding. The effect of increasing carbon content in the electrode on reducing weld cracking is clearly shown in Table VIII.

*Example V*

In order to evaluate the effect of manganese on the quality of iron-nickel welds of the Invar type, another series of coated electrodes was prepared in which the manganese content was varied. The amount of manganese introduced through a flux coating was varied over a rather large range. The core wire contained about 36% nickel, about 0.4% manganese, about 0.05% silicon, about 1.59% titanium, less than about 0.02% carbon with the balance essentially iron, and its diameter was about 5/32 inch. The flux used was of a lime-cryolite type and it contained 47% calcium carbonate, 50% cryolite and 3% bentonite which was bonded with an aqueous solution of sodium silicate. No carbon was added to the weld through the coating as elemental or free carbon and the carbon level of the coating was less than 0.2%. The results of this series of tests are listed in Table IX.

TABLE IX

| Weld No. | Manganese content in coating, percent | Manganese content in electrode, percent * | Weld analysis, percent | | X-weld data | |
|---|---|---|---|---|---|---|
| | | | Mn | Ti | Cracks | Porosity |
| 25 | None | 0.4 | 0.3 | 0.08 | 20+ | None |
| 26 | 5 | 2.7 | 1.10 | 0.06 | 0.5 | None |
| 27 | 10 | 5.0 | 2.11 | 0.09 | 1.5 | None |
| 28 | 15 | 7.2 | 3.21 | 0.10 | 0 | None |

* By weight of the electrode exclusive of slag-forming and flux-forming ingredients.

These tests with the results set forth in Table IX demonstrate the benefits of manganese additions in reducing weld cracking.

The present invention is applicable to the welding and overlaying of Invar type alloys containing 30% to 60% nickel, up to about 20% manganese, up to about 5% titanium, up to about 3% silicon, up to about 0.1% calcium, up to about 40% cobalt, up to about 10% chromium, up to about 5% tungsten, up to about 5% molybdenum and up to about 5% aluminum with the balance essentially iron. In addition, the present invention is applicable to the welding and overlaying of very heavy sections of Invar type alloys, e.g., Invar type alloys having thickness of more than about one inch. The advent of the welding materials of this invention permits the use of the remarkable Invar type alloys in the construction of a wide range of articles including even large objects such as radar towers and any other objects, components, etc., for which extreme dimensional stability over a wide range of thermal and/or cryogenic cycling along with good corrosion resistance, good toughness at low temperature and adequate strength at high temperatures is desirable. Among the other objects, components, etc., for which the welding materials of the present invention can be advantageously utilized are transmission and/or transition lines for liquid oxygen, liquid helium, liquid nitrogen and other materials that must be carried at sub-zero temperatures, lines for the intermittent transfer of steam, etc., wave guides for electronic components and components for charged particle accelerators requiring dimensional stability.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A filler metal for use in inert-gas arc welding containing, by weight, about 36% nickel, about 3% manganese, about 1% titanium, about 0.1% silicon, about 0.1% carbon, about 0.02% calcium with the balance, apart from incidental elements, essentially iron.

2. A filler metal for use in inert-gas arc welding containing, by weight, about 30% to about 40% nickel, about 0.8% to about 1.5% titanium, about 0.05% to about 0.2% carbon, about 1% to about 3.5% manganese, up to about 30% cobalt, up to about 10% chromium, up to about 5% tungsten, up to about 5% molybdenum, up to about 5% aluminum, up to about 0.3% silicon and up to about 0.05% calcium with the balance, apart from incidental elements, essentially iron in amounts of at least about 35%.

3. A welding material for use in inert-gas metal-arc welding containing, by weight, about 30% to about 60% nickel, about 0.8% to about 3% titanium, up to about 4% manganese, up to about 0.35% carbon, up to about 2.5% silicon, up to about 0.1% calcium, up to about 40% cobalt, up to about 10% chromium, up to about 5% tungsten, up to about 5% molybdenum and up to about 5% aluminum with the balance iron in amounts of at least about 25%.

4. A welding material capable of being used with flux-forming and slag-forming ingredients and containing, by weight of metallic constituents, carbon and silicon, about 30% to about 40% nickel, about 0.8% to about 2% titanium, about 0.05% to about 0.35% carbon, about 1% to about 3.5% manganese provided that when the welding material is used in combination with flux-forming and slag-forming ingredients the summation of the manganese percentage and twelve and one-half times the carbon percentage is at least about 3%, up to about 30% cobalt, up to about 10% chromium, up to about 5% tungsten, up to about 5% molybdenum, up to about 5% aluminum, up to about 0.5% silicon and up to about 0.05% calcium with the balance essentially iron in amounts of at least about 35%.

5. A welding material capable of being used with flux-forming and slag-forming ingredients and containing, by weight of metallic constituents, carbon and silicon, about 30% to about 60% nickel, about 0.5% to about 3% titanium, up to about 8% of manganese, up to about 0.8% carbon, provided that when the welding material is used in combination with slag-forming and flux-forming ingredients the amounts of manganese and carbon are correlated to the titanium content such that when the titanium is over about 2% the summation of manganese and ten times carbon is more than about 2% and when the titanium content is less than about 2% the manganese is present in an amount of not less than about 1% and the summation of manganese and twelve and one-half times carbon is at least about 3%, up to about 2.5% silicon, up to about 0.1% calcium, up to about 40% cobalt, up to about 10% chromium, up to about 5% tungsten, up to about 5% molybdenum and up to about 5% aluminum with the balance iron in amounts of at least about 25%.

6. A core wire for a coated arc welding electrode containing, by weight, about 36% nickel, about 3% manganese, about 0.1% silicon, about 0.1% carbon, about 1% titanium, about 0.02% calcium with the balance essentially iron.

7. A core for a coated arc welding electrode containing, by weight, about 0.8% to about 2% titanium, about 30% to 40% nickel, about 0.05% to about 0.35% carbon, about 1% to about 3.5% manganese, the sum of manganese percentage and twelve and one-half times the carbon percentage being at least 3%, up to about 30% cobalt, up to about 10% chromium, up to about 5% tungsten, up to about 5% molybdenum, up to about 5% aluminum, up to about 0.3% silicon and up to about 0.05% calcium with the balance essentially iron in amounts of at least about 35%.

8. A coated electrode having a core containing, by weight of metallic constituents, carbon and silicon, about 30% to about 60% nickel, about 2% to about 3% titanium, up to about 8% manganese, up to about 0.8% carbon, the amounts of carbon and manganese being so correlated that the summation of manganese percentage and ten times carbon percentage is more than about 2%, up to about 2.5% silicon, up to about 0.1% calcium, up to about 40% cobalt, up to about 10% chromium, up to about 5% tungsten, up to about 5% molybdenum and up to about 5% aluminum with the balance essentially iron in amounts of at least about 25%; and having a flux coating containing from about 20% to about 55% of flux-forming and slag-forming ingredients by weight of the electrode.

9. A coated electrode having a core containing, by weight of metallic constituents and carbon, about 30% to about 60% nickel, about 0.5% to about 2% titanium, about 1% to about 8% manganese, up to about 0.8% carbon, the amounts of manganese and carbon being so correlated that the summation of manganese percentage and twelve and one-half times carbon percentage is at least about 3%, up to 2.5% silicon, up to about 0.1% calcium, up to about 40% cobalt, up to about 10% chromium, up to about 5% tungsten, up to about 5% molybdenum and up to about 5% aluminum with the balance essentially iron in amounts of at least about 25%; and having a flux coating containing from about 20% to about 55% of flux-forming and slag-forming ingredients by weight of the coated electrode.

10. A welding material for use as a coated electrode in conjunction with slag-forming and flux-forming ingredients containing, by weight of metallic constituents, carbon and silicon, about 30% to about 60% nickel, about 0.5% to about 3% titanium, up to about 8% manganese, up to about 0.8% carbon, the amounts of manganese and carbon are so correlated to the titanium content that when the titanium content is over about 2% the summation of manganese percenage and ten times carbon percentage is more than about 2% and when the titanium content is less than about 2% manganese is present in an amount of not less than 1% and the summation of manganese percentage and twelve and one-half times the carbon percentage is at least about 3%, up to about 2.5% silicon, up to about 0.1% calcium, up to about 40% cobalt, up to about 10% chromium, up to about 5% tungsten, up to about 5% molybdenum and up to about 5% aluminum with the balance essentially iron in amounts of at least about 25%.

11. A coated arc welding electrode having a core containing, by weight, about 36% nickel, about 3% manganese, about 1% titanium, about 0.1 silicon, about 0.1% carbon and about 0.02% calcium with the balance essentially iron and having a flux containing, by weight, about 33% calcium carbonate, about 31% cryolite, about 32% titanium dioxide, about 1% carbon and about 3% bentonite.

12. A coated arc welding electrode having a core containing, by weight, about 30% to about 40% nickel, about 0.8% to about 1.5% titanium, about 0.1% to about 3.5% manganese, about 0.05% to about 0.2% carbon, the sum of manganese percentage and twelve and one-half times carbon percentage being at least about 3%, up to about 30% cobalt, up to about 10% chromium, up to about 5% tungsten, up to about 5% molybdenum, up to about 5% aluminum, up to about 0.3% silicon and up to about 0.05% calcium with the balance essentially iron and a flux containing, by weight, about 20% to about 55% alkaline earth metal carbonate, about 10% to about 50% cryolite and up to about 40% titanium dioxide.

13. A coated arc welding electrode having a core containing, by weight, about 30% to about 40% nickel, about 0.8% to about 1.5% titanium, about 1% to about 3.5% manganese, about 0.05% to about 0.2% carbon, the sum of manganese percentage and twelve and one-half times carbon percentage being at least about 3%, up to about 30% cobalt, up to about 10% chromium, up to about 5% tungsten, up to about 5% molybdenum, up to about 5% aluminum, up to about 0.3% silicon, up to about 0.05% calcium with the balance essentially iron and a flux containing, by weight, about 25% to about 55% calcium carbonate, about 20% to about 40% cryolite, about 10% to about 40% titanium dioxide and about 2% to about 5% bentonite.

14. A coated arc welding electrode having a core containing, by weight, about 30% to about 60% nickel, about 0.5% to about 3% titanium, up to about 4% manganese, up to about 0.35% carbon, up to about 2.5% silicon, up to about 0.1% calcium, up to about 40% cobalt, up to about 10% chromium, up to about 5% tungsten, up to about 5% molybdenum and up to about 5% aluminum with the balance essentially iron in amounts of at least about 25% and having a flux containing, by weight, about 25% to about 55% alkaline earth metal carbonate, about 10% to about 50% cryolite, up to about 40% titanium dioxide, up to about 20% manganese and up to about 2% carbon; said electrode having the amounts of any manganese and any carbon so correlated to the titanium content that when the titanium content of the core is over about 2% the summation of manganese percentage and ten times carbon percentage is more than about 2%, by weight of metallic constituents plus any carbon and plus any silicon, and when the titanium content of the core is less than about 2%, manganese is present in an amount of not less than about 1%, by weight of metallic constituents plus any carbon and plus any silicon, and the summation of manganese percentage and twelve and one-half times any carbon percentage is at least about 3%, by weight of metalllic constituents plus any carbon and plus any silicon.

15. A process for producing a sound weld having a low coefficient of thermal expansion on an Invar alloy member which comprises providing a welding material capable of being used with flux-forming and slag-forming ingredients and containing, by weight of metallic constituents, carbon and silicon, about 30% to about 60% nickel, about 0.5% to about 3% titanium, up to about 8% of manganese, up to about 0.8% carbon, provided that when the welding material is used in combination with slag-forming and flux-forming ingredients the amounts of manganese and carbon are so correlated to the titanium content such that when the titanium is over about 2% the summation of manganese percentage and ten times the carbon percentage is more than about 2% and when the titanium content is less than about 2% the manganese is present in an amount of not less than about 1% and the summation of manganese percentage and twelve and one-half times the carbon percentage is at least about 3%, up to about 2.5% silicon, up to about 0.1% calcium, up to about 40% cobalt, up to about 10% chromium, up to about 5% tungsten, up to about 5% molybdenum and up to about 5% aluminum with the balance iron in amounts of at least about 25%; melting said welding material by arc welding and depositing the melted metal on the Invar member in a shielded atmosphere.

16. The process of producing a sound weld having a low coefficient of expansion which comprises providing two restrained Invar members having a thickness of at least one-fourth inch and a welding material capable of being used with flux-forming and slag-forming ingredients which welding material contains, by weight of metallic constituents, carbon and silicon, about 30% to about 60% nickel, about 0.8% to about 3% titanium, up to about 8% manganese, up to about 0.8% carbon, provided that when the welding material is used in combination with slag-forming and flux-forming ingredients the amounts of manganese and carbon are correlated to the titanium content such that when the titanium is over about 2% the summation of manganese percentage and ten times the carbon percentage is more than about 2% and when the titanium content is less than about 2% the manganese is present in an amount of not less than about 1% and the summation of manganese percentage and twelve and one-half times the carbon percentage is at least about 3%, up to about 2.5% silicon, up to about 0.1% calcium, up to about 40% cobalt, up to about 10% chromium, up to about 5% tungsten, up to about 5% molybdenum and up to about 5% aluminum with the balance iron in amounts of at least about 25%; melting said welding material by arc welding and depositing the melted metal between the Invar members in a shielded atmosphere.

References Cited by the Examiner

UNITED STATES PATENTS

| | | | |
|---|---|---|---|
| 2,043,960 | 6/36 | Jones et al. | 219—73 |
| 2,694,764 | 11/54 | Muller | 219—74 |
| 2,730,443 | 1/56 | Post et al. | 75—123 |

RICHARD M. WOOD, *Primary Examiner.*

JOSEPH V. TRUHE, Sr., *Examiner.*